Sept. 22, 1931.   G. VAN DAAM   1,824,246
TIRE REMOVING MACHINE
Filed Dec. 2, 1929

Inventor
Gerrit Van Daam
By Barton A. Bean Jr.
Attorney

Patented Sept. 22, 1931

1,824,246

UNITED STATES PATENT OFFICE

GERRIT VAN DAAM, OF KENMORE, NEW YORK

TIRE REMOVING MACHINE

Application filed December 2, 1929. Serial No. 411,150.

This invention relates to a machine for facilitating the removal of tires from their supporting rims, and more particularly to the removal of tires from rims having a fixed diameter with a removable side ring.

The removal of a tire from this type of rim, especially after being in long and uninterrupted service, is a difficult operation and frequently requires the expenditure of considerable work and exertion on the part of the individual making the tire change.

The present invention aims to provide a machine by which the removal of the tire is greatly facilitated and may be expeditiously accomplished with a minimum effort on the part of the operator or workman.

The invention further resides in the provision of a machine of this character which will accommodate the various sized rims, and also provide for substantially uniform removal of the tire from the rim about its entire periphery.

The invention further resides in the salient features of construction and the arrangements and combinations of parts hereinafter more fully described and claimed, reference being had to the accompanying drawings wherein Fig. 1 is a top plan view of the improved machine with portions broken away.

Figure 2:
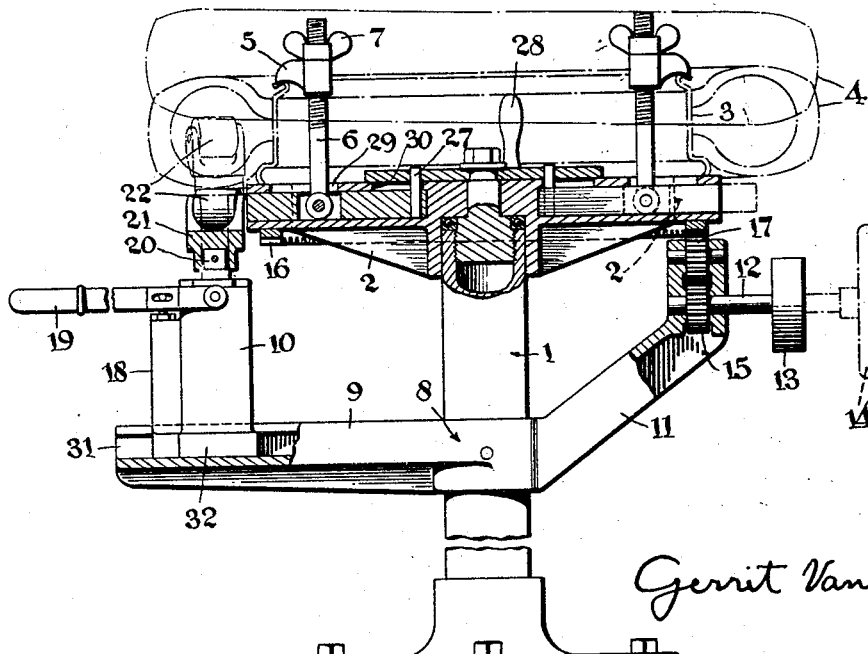
Fig. 2 is a vertical sectional view thereof with parts left in elevation.

Referring more in detail to the accompanying drawings, the numeral 1 designates a standard or support on the upper end of which is mounted a table 2 preferably having a fixed diameter of a size for accommodating the smallest sized rim, as indicated by the dotted rim 3 in Fig. 2. This rim is placed upon the table with the removal ring side uppermost so that the tire indicated at 4 may be shifted axially in an upward direction during the removal operation. The rim is securely held on the table by a plurality of hooks 5 engaging over the rim, these hooks being carried by their shank members 6 which in turn are pivotally connected to the table 2. The said hooks are preferably slidable on their shanks and brought into clamping relation with the rim as by means of the nuts 7 threaded onto the shanks 6.

Mounted on the standard 1 beneath the table is a bracket 8 having a jack supporting arm 9, for supporting the jack 10 in proximity to the periphery of the table 2, and a second arm 11 which carries a mechanism for providing relative rotary movement between the jack and said table. In the preferred embodiment this mechanism comprises a drive shaft 12 which may be power actuated, as by means of a belt (not shown) taking over a pulley 13, or manually actuated, as by means of a hand wheel 14. Fixed on the shaft 12 is a gear 15 having operative connection with an annular rack 16 on the table, an interposed transmission 17 being provided where desired.

The jack 10 may be of any suitable character and in the present illustration it has been shown as being of the hydraulic type having a power cylinder 18 the piston of which is reciprocated by means of an actuator 19 so as to extend the plunger rod 20 of the work cylinder vertically against the overlying tire 4. The plunger rod 20 is herein illustrated as supporting a tire engaging head 21, and where desired this head may carry one or more rollers 22 for rolling contact on the side wall of the tire casing.

The jack or applicator is manipulated to exert upward pressure against the tire casing, and by means of the table being revolved through the mechanical movement 12—17, this upward pressure of the jack will be applied progressively to the tire about the periphery of the rim thereby gradually wedging and shifting the tire upwardly, or laterally of the rim 3, and as the jack is continued in its operation the tire will be finally freed from the rim. It is preferred to fix either the table or the bracket and in the drawings I have shown the latter fixed and the table rotatably mounted to provide for the relative rotary movement between the table and the jack, the latter term being used broadly to include any means or device for exerting pressure on the tire in a direction parallel to the axis of the table.

To accommodate larger size rims the table is made expansible as by radially adjustable parts in the form of supporting bars or spokes 23. These supporting members are mounted to slide within radial pockets or chambers 24 formed in the table and opening through the periphery thereof, and by adjusting the supporting members outwardly there is provided an annular series of supports on which the larger sized rims are seated. Means are provided for retracting and projecting the supporting bars 23 in unison, such as a disc 25 rotatable about the axis of the table and having a series of cam slots 26 for receiving upstanding lugs or pins 27 on the inner ends of the bars whereby upon rotating the disc 25, as by its handle 28, the lugs 27 will be cammed against to simultaneously project or retract the several supporting bars, in accord with the direction of rotation of the disc. The hook carrying shanks 6 may also be concurrently adjusted if desired, and to this end these shanks have been illustrated as being carried by the supporting bars, suitable slots 29 and 30 being provided in the upper wall of each guideway or pocket 24 to respectively accommodate the shanks 6 and the lugs 27.

Figure 1:
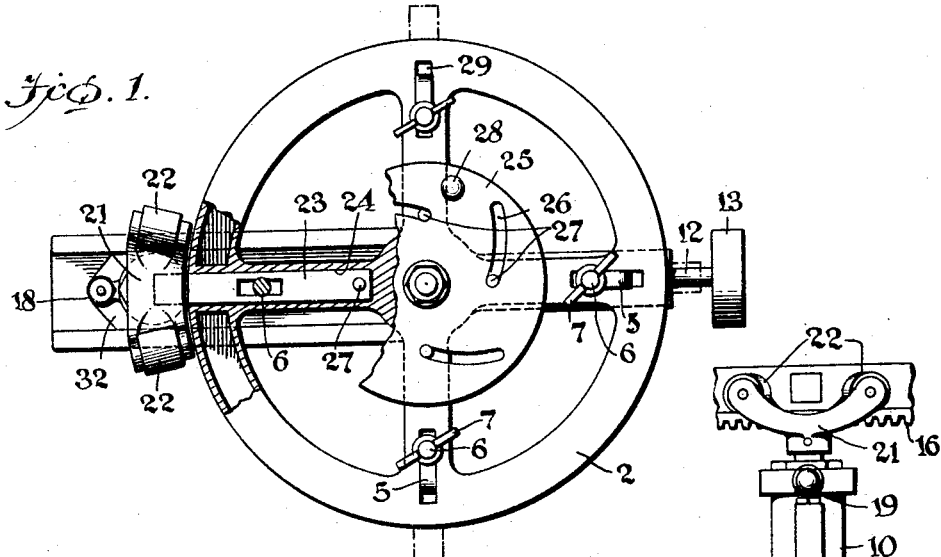
Figure 3:
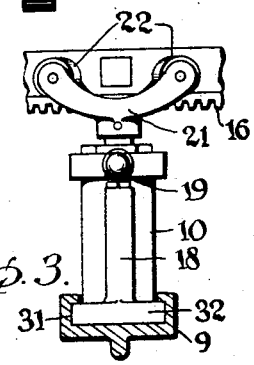
Fig. 3 is a detail view further illustrating the power applicator or jack.

In providing for the accommodation of different sized rims, provision is also made for adjustability in the mounting of the jack 10 whereby the point of application of the tire removing pressure may be correspondingly selected. A simple manner of adjustably mounting the jack is shown herein as consisting of a channel or guideway 31 in the upper face of the arm 9 to receive and overhang the flanged base 32 of the jack, as is most clearly depicted in Fig. 3, and by means of this mounting the jack may be slid inwardly or outwardly to best locate the jack for the tire being operated upon.

The annular rack or gear 16 may be of any diameter but by giving it a maximum diameter as herein depicted there will be a minimum power requirement to rotate the table.

What is claimed is:

A tire removing machine comprising a standard, a table thereon, a bracket thereon having a pair of arms, said table having radial guideways, supporting members slidably mounted in said guideways, means for radially adjusting the supporting member simultaneously, said bracket having a channeled guideway in one of its arms, a removable jack having a flanged base slidably interlocked in the bracket guideway and having a part movable across the periphery of the table for exerting a tire shifting pressure on the tire supported by the table, and means on the other bracket arm for providing relative rotary movement between the table and bracket.

GERRIT VAN DAAM.